United States Patent
Fujisawa et al.

(10) Patent No.: US 8,242,187 B2
(45) Date of Patent: Aug. 14, 2012

(54) SILICONE POLYMER, OCULAR LENSES, AND CONTACT LENS

(75) Inventors: Kazuhiko Fujisawa, Shiga (JP); Tsutomu Goshima, Shiga (JP); Masataka Nakamura, Shiga (JP)

(73) Assignee: Toray Industries, Inc. (JP)

( * ) Notice: Subject to any disclaimer, the term of this patent is extended or adjusted under 35 U.S.C. 154(b) by 12 days.

(21) Appl. No.: 12/443,433

(22) PCT Filed: Sep. 27, 2007

(86) PCT No.: PCT/JP2007/068826
§ 371 (c)(1), (2), (4) Date: Aug. 24, 2009

(87) PCT Pub. No.: WO2008/038719
PCT Pub. Date: Apr. 3, 2008

(65) Prior Publication Data
US 2010/0056738 A1    Mar. 4, 2010

(30) Foreign Application Priority Data
Sep. 29, 2006 (JP) ................................. 2006-266707

(51) Int. Cl.
*G02B 1/04* (2006.01)
*G02C 7/04* (2006.01)
*G02C 7/02* (2006.01)

(52) U.S. Cl. ..................... 523/106; 526/279; 351/160 H
(58) Field of Classification Search ................... 526/279
See application file for complete search history.

(56) References Cited

U.S. PATENT DOCUMENTS

| | | | | |
|---|---|---|---|---|
| 5,340,583 A | * | 8/1994 | Dziabo et al. | 424/412 |
| 5,760,100 A | * | 6/1998 | Nicolson et al. | 523/106 |
| 5,962,548 A | * | 10/1999 | Vanderlaan et al. | 523/107 |
| 5,994,488 A | * | 11/1999 | Yokota et al. | 526/279 |
| 6,239,240 B1 | * | 5/2001 | Schultz et al. | 526/277 |
| 6,649,722 B2 | * | 11/2003 | Rosenzweig et al. | 526/279 |
| 7,317,117 B2 | * | 1/2008 | Nakamura et al. | 556/443 |
| 2001/0050749 A1 | * | 12/2001 | Watanabe | 351/160 H |
| 2004/0014921 A1 | * | 1/2004 | Fujisawa et al. | 526/303.1 |
| 2004/0249180 A1 | * | 12/2004 | Nakamura et al. | 556/443 |
| 2005/0237483 A1 | * | 10/2005 | Phelan | 351/162 |
| 2006/0007391 A1 | * | 1/2006 | McCabe et al. | 351/160 H |
| 2008/0231798 A1 | * | 9/2008 | Zhou et al. | 351/160 H |

FOREIGN PATENT DOCUMENTS

| | | |
|---|---|---|
| EP | 0604369 | 6/1994 |
| JP | 11-502949 | 3/1999 |
| JP | 11-502949 A * | 3/1999 |
| JP | 11-326849 | 11/1999 |
| JP | 2007-56220 | 3/2007 |
| WO | 9924543 | 3/1999 |
| WO | WO03/021336 | 3/2003 |
| WO | 2005014074 | 2/2005 |

* cited by examiner

*Primary Examiner* — Robert S Loewe
(74) *Attorney, Agent, or Firm* — Pillsbury Winthrop Shaw Pittman LLP; Raj S. Dave

(57) ABSTRACT

A silicone polymer having sufficient antibacterial properties and high transparency; and Ophthalmic lenses made of the polymer, such as a contact lens, and artificial cornea. The silicone polymer is characterized by being obtained by and a monomer having an ammonium salt in the molecule.

12 Claims, No Drawings

SILICONE POLYMER, OCULAR LENSES, AND CONTACT LENS

FIELD OF THE INVENTION

The present invention relates to a silicone polymer having an antimicrobial activity and transparency. The polymer is suitably used particularly for ophthalmic lenses such as contact lenses, intraocular lenses and artificial cornea.

BACKGROUND OF THE INVENTION

One of the common problems suffered by contact lens wearers is an infection with bacteria. As one of countermeasures, a method of suppressing adhering of bacteria during preservation of contact lenses by containing antimicrobial components in a cleaning/storage solution for the contact lenses (for example, see the Patent Document 1). However, the method was not advantageous in that the antimicrobial components were easily washed away when the contact lenses taken out of the cleaning/storage solution were simply washed with water, thereby failing to obtain a sufficient effect of controlling infections with bacteria while the contact lenses were being worn.

Apart from the foregoing method, there was such an approach that an antimicrobial activity was imparted to a material of the contact lens. For example, the Patent Documents 2 and 3 recite antimicrobial contact lenses obtained by copolymerizing a non-silicone hydrogel material with a quaternary ammonium salt monomer having an antimicrobial activity. However, these contact lenses, in which the non-silicone hydrogel is used as the material, unfavorably could not obtain such a high degree of oxygen permeability that was necessary for the continuous wear of the contact lenses.

Further, the Patent Document 4 recites that a silicone hydrogel material having the high oxygen permeability is copolymerized with the quaternary ammonium salt monomer. However, the silicone compound used in the relevant Document is a silicone macromer having a large molecular weight, which is poor in solubility in the ammonium salt monomer having a high hydrophilicity. As a result, it was not possible to obtain a transparent polymer.

PATENT DOCUMENT 1: Japanese Translations of PCT Application No. 2006-509532
PATENT DOCUMENT 2: Japanese Patent Application Laid-Open No. 06-337378
PATENT DOCUMENT 3: Japanese Patent Application Laid-Open No. 63-30820
PATENT DOCUMENT 4: Japanese Translation of PCT Application No. 11-502949

DISCLOSURE OF THE INVENTION

Problem to be Solved by the Invention

An object of the present invention is to provide a silicone polymer having a sufficient antimicrobial activity and a high transparency, and ophthalmic lenses in which the silicone polymer is used, such as contact lenses, intraocular lenses and artificial cornea.

Means for Solving the Problem (1) A silicone polymer obtained by polymerizing one or at least two silicone monomers having a molecular weight of 1,800 or less and a monomer mixture including a monomer having ammonium salt in a molecule thereof.

(2) The silicone polymer according to (1), wherein the silicone monomers include a silicone monomer having a structure expressed by the following general formula (a)

$$M\text{-}L\text{-}Sx \quad (a)$$

(M represents an acryl group or a methacryl group. L represents an optionally substituted divalent organic group having 1-20 carbon atoms. Sx represents a siloxanyl group expressed by the following general formula (b).

[Formula 1]

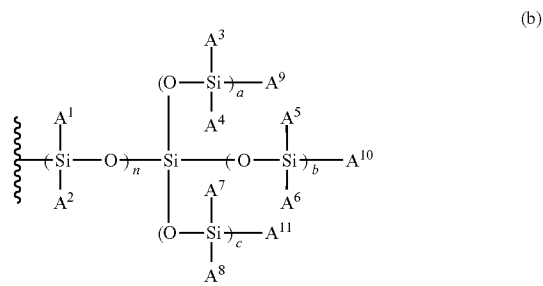

(In the formula (b), $A^1$-$A^{11}$ each independently represents any of hydrogen, an optionally substituted alkyl group having 1 to 20 carbon atoms and an optionally substituted aryl group having 6 to 20 carbon atoms. n represents an integral number of 0 to 200, and a, b and c each independently represents an integral number of 0 to 20, except for the case where n=a=b=c=0).

(3) The silicone polymer according to (2), wherein L in the formula (a) represents a divalent organic group having at least a hydroxyl group.

(4) The silicone polymer according to (3), wherein L in the formula (a) is a divalent organic group expressed by the following general formula (c):

[Formula 2]

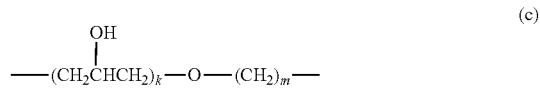

(wherein k represents an integral number of 1 to 6, and m represents an integral number of 1 to 17, provided that $3k+m \leq 20$).

(5) The silicone polymer according to any of (1) to (4), wherein at least one of the silicone monomers is a monomer selected from the group consisting of monomers having structures expressed by the following formulas (d), (e) and (i).

[Formula 3]

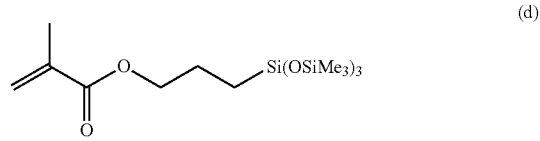

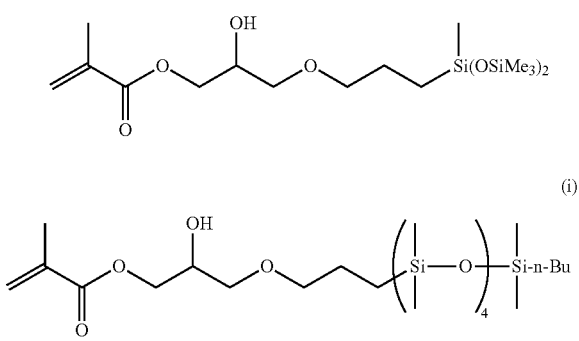

(6) The silicone polymer according to any of (1) to (5), wherein the monomer having the ammonium salt in the molecule thereof is a monomer represented by the following formula (f).

[Formula 4]

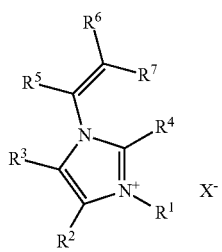

(wherein $R^1$ represents an optionally substituted alkyl group having 1 to 30 carbon atoms. $R^2$ to $R^7$ each represents an optionally substituted alkyl group having 1 to 20 carbon atoms or an optionally substituted aryl group having 6 to 20 carbon atoms. $R^2$ and $R^3$ may together form a ring. $X^-$ represents an optional anion.)

(7) The silicone polymer according to (6), wherein $R^1$ in the formula (f) is an optionally substituted alkyl group having 4 to 20 carbon atoms.

(8) An ophthalmic lens, wherein the polymer according to any of (1) to (7) is used.

(9) A contact lens, wherein the polymer according to any of (1) to (7) is used.

Effect of the Invention

The present invention can provide a silicone polymer having sufficient antimicrobial activity and high transparency at satisfactory levels, and ophthalmic lenses in which the silicone polymer is used, such as contact lenses, intraocular lenses and artificial cornea.

BEST MODE FOR CARRYING OUT THE INVENTION

The silicone polymer according to the present invention can be obtained by polymerizing one or at least two silicone monomers having a molecular weight of 1,800 or less and a monomer mixture solution containing at least one monomer having an ammonium cation in a molecule thereof are polymerized.

When such a substance having a large molecular weight as a silicone macromer, for example, is copolymerized with the ammonium cation monomer having high hydrophilicity, a unit quantity of the silicone component having high hydrophobicity is too large in the copolymerized polymer, which makes it difficult for the silicone component to obtain solubility in the hydrophilic ammonium cation monomer. Accordingly, it becomes difficult to obtain a transparent silicone polymer. On the contrary, in the silicone polymer according to the present invention, wherein the molecular weight of all of the silicone monomers used therein is 1,800 or less, the unit quantity of the silicone component in the copolymerized polymer is adequately reduced, and the transparent silicone polymer can be obtained as a result of the copolymerization with the hydrophilic ammonium cation monomer. Further, a sufficient number of siloxane bonds cannot be contained in the case where the molecular weight is too small, which results in the failure to obtain an oxygen permeability required for ophthalmic lenses and contact lenses. Therefore, the molecular weight of the silicone monomer is preferably 300 to 1,800, more preferably 320 to 1,500, even more preferably 340 to 1,200 and most preferably 340 to 780. In the case of a silicone monomer showing a distribution in its molecular weight, such as polydimethyl siloxane having a methacryl group at a terminal thereof, at least 80% of a UV area value when the molecular weight distribution is GPC-measured is 1,800 or less, "the molecular weight is determined as 1,800 or less".

The silicone monomer with at least two polymerizable group functions as a crosslinker. Therefore, a silicone monomer having a polymerizable group in a molecule thereof, which is expressed by the following general formula (a), is preferably used in the present invention.

$$M\text{-}L\text{-}Sx \qquad (a)$$

M in the formula (a) represents a radically polymerizable group. Examples of the radically polymerizable group include: a vinyl group; allyl group; vinyloxy group; allyloxy group; vinyl carbamate group; allyl carbamate group; vinyl carbonate group; allyl carbonate group; metacryloyl group; acryloyl group; styryl group; and the like. Of these examples, an acryloyl group and a metacryloyl group are preferably used in view of the modulus of the obtained polymer.

L in the formula (a) represents an optionally substituted divalent organic group having 1 to 20 carbon atoms. In order to reduce the modulus of the obtained polymer, an alkylene group is more preferably used, and a hydroxyl group and an ethylene oxide structure are preferably used in order to increase the solubility in the hydrophilic polymer. Preferable examples include divalent hydrocarbon groups such as: a methylene group; ethylene group; propylene group; 1-methylethylene group; 2-methylethylene group; n-propylene group; n-butylene group; 2-methylpropylene group; 2,2-dimethylpropylene group; and n-pentylene group, divalent organic groups having a hydroxyl group such as: 2-hydroxypropylene group; 2-hydroxybutylene group; and 3-hydroxybutylene group, such divalent organic groups having an ether bond that are expressed by the following formulas (L-1) to (L-3), and such divalent organic groups having an ether bond and hydroxyl group that are expressed by the following formulas (L-4) and (L-5), and the like.

[Formula 5]

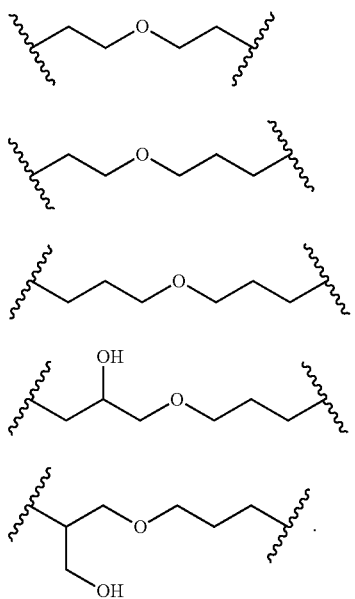

(L-1)
(L-2)
(L-3)
(L-4)
(L-5)

Of these formulas, a structure expressed by the formula (c) is preferable:

[Formula 6]

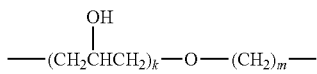

(c)

and the case where k and m in the formula (c) are respectively preferably k=1 and m=1 to 5 is more preferable.

Sx in the formula (a) represents a siloxanyl group. The siloxanyl group represents a group having at least one Si—O—Si bond in a structure thereof.

[Formula 7]

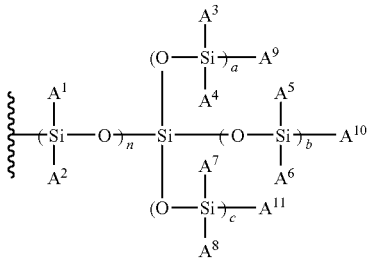

(b)

n, a, b and c each represents an integral number of 0 to 24, and $0<n+a+b+c<25$. $n+a+b+c$ represents the number of the siloxane bonds in the silicone compound. The oxygen permeability required for the ophthalmic lenses and contact lenses cannot be obtained when the number represented by $n+a+b+c$ is too small, while solubility in the hydrophilic ammonium salt monomer is deteriorated when the number is too large, which results in the failure to obtain a transparent lens. Therefore, the number is preferably 1 to 24, more preferably 2 to 17, and most preferably 2 to 11.

$A^1$ to $A^{11}$ each represents an optionally substituted alkyl group having 1 to 20 carbon atoms or an optionally substituted aryl group having 6 to 20 carbon atoms. Compounds having these substituents can be industrially obtained at relatively low prices. Therefore, of the substituents having the structures mentioned above, a group selected from the group consisting of tris (trimethylsiloxy)silyl group; methylbis(trimethylsiloxy) silyl group; dimethyltrimethylsiloxysilyl group; and poly(dimethylsiloxane) group is most particularly suitable.

Of the silicone monomers expressed by the general formula (a), silicone monomers expressed by the following formulas (d), (e) and (i) are preferably used in view of solubility in the hydrophilic monomer and ammonium salt monomer and the oxygen permeability, mechanical characteristics and the like of the polymer obtained from the polymerization.

[Formula 8]

(d)

(e)

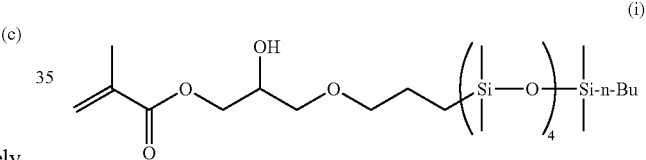

(i)

Further, silicone monomers having a hydroxyl group in a molecule thereof as expressed by the formulas (d), (e) and (i) are most preferably used since the transparent silicone polymer can be easily obtained even if these are mixed with an internal wetting agent such as polyvinylpyrrolidone.

The ammonium salt monomer used in the silicone polymer according to the present invention is preferably a monomer having a polymerizable group and an ammonium cation in a molecule thereof. The polymerizable group is not particularly limited as far as it is radically polymerizable, and examples thereof include a (meth) acryloyl group; (meth) acrylamide group; styryl group; allyl group; vinyl group; and other groups radically polymerizable and having a carbon/carbon unsaturated bond. In the ammonium cation group, three substituents other than a substituent group bonded to a polymerizable group on a nitrogen atom are each independently an optionally substituted alkyl group having 1 to 20 carbon atoms, or an optionally substituted aryl group having 6 to 20 carbon atoms, and these substituents may together form a ring. In other words, four substituents including a group having a polymerizable group on the ammonium cation may together form a ring. Further, two or three of the four substituents may be identical to one another, more specifically, may form a double bond or a triple bond with the nitrogen atom of the ammonium cation. More specific structural examples include ammonium salt monomers expressed by the following general formulas (f), (g) and (h):

[Formula 9]

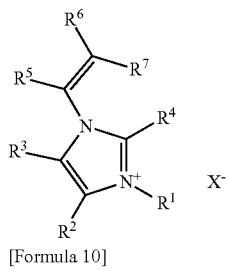
(f)

[Formula 10]

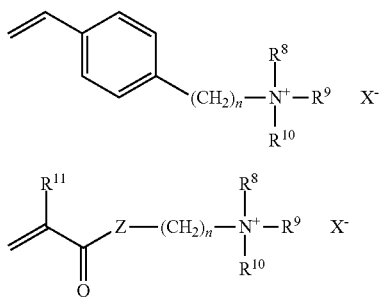
(g)

(h)

(In the formulas (g) and (h), $R^8$ to $R^{18}$ each independently represents an optionally substituted alkyl group having 1 to 20 carbon atoms or an optionally substituted aryl group having 6 to 20 carbon atoms. $R^{11}$ represents hydrogen or a methyl group. Z represents O or NH. X represents an optional anion.) Of these examples, vinyl imidazolium salt expressed by the general formula (f) is most preferably used in view of its thermal stability and antimicrobial activity.

In the general formula (f), $R^1$ represents an optionally substituted alkyl group having 1 to 30 carbon atoms. In the case where the number of the carbon atoms is too small, the solubility in the silicone monomer is deteriorated in solubility in the ammonium cation portion. In the case where the number of the carbon atoms is too large, solubility in the hydrophilic monomer is deteriorated. Therefore, the number of the carbon atoms is preferably 4 to 20, and more preferably 4 to 15.

In the general formula (f), $R^2$ to $R^7$ each represents an alkyl group having 1 to 20 carbon atoms which may be substituted or an aryl group having 6 to 20 carbon atoms which may be substituted. $R^2$ and $R^3$ may together form a ring.

In the general formula (f), X represents an optional anion. Examples thereof include halide ions such as: fluorine ion; chloride ion; bromide ion; and iodide ion, and tetrafluoroborate ions such as: hydroxide ion; sulfate ion; and nitrate ion. Of these examples, halide ions are most preferably used in view of easiness in synthesis.

In the case where an amount of the silicone monomer to be included in the silicone polymer according to the present invention is too small, the oxygen permeability thereby obtained is insufficient. In the case where the amount is too large, solubility in the ammonium salt monomer is hardly obtained. Therefore, the amount of the silicone monomer to be included is preferably 20 to 80 parts by weight, more preferably 30 to 80 parts by weight, and most preferably 50 to 80 parts by weight, provided that a total weight of the various monomers other than the ammonium salt monomer is 100 parts by weight.

In the case where an amount of the ammonium salt monomer to be included in the silicone polymer according to the present invention is too small, the antimicrobial activity thereby obtained is poor. In the case where the amount is too large, the ammonium salt monomer is not easily soluble in the silicone monomer. Therefore, the amount is preferably 0.001 to 20 parts by weight, more preferably 0.005 to 15 parts by weight, and most preferably 0.01 to 10 parts by weight.

In the case where the silicone polymer according to the present invention is used for ophthalmic lenses, particularly for contact lenses, it is preferable to copolymerize the hydrophilic polymer other than the silicone monomer and the ammonium salt monomer. The hydrophilic monomer to be copolymerized is not particularly limited as far as it is copolymerizable. Examples thereof include monomers having: a (meth)acryloyl group; styryl group; allyl group; vinyl group; and other polymerizable carbon/carbon unsaturated bond.

Some of specific examples thereof are listed below, however, the present invention is not limited thereto. carboxylic acids such as: (meth)acrylic acid; itaconic acid; crotonic acid; and vinylbenzoic acid, (meth)acrylates having a hydroxyl group such as 2-hydroxyethyl(meth)acrylate, (meth)acrylamides such as N,N-dimethylacrylamide, N-vinylpyrrolidone, N-vinylimidazole, and the like. Of these examples, (meth)acrylamides such as N,N-dimethylacrylamide are preferably used in view of the mechanical characteristics and preservation stability of the obtained silicone polymer.

Further, it is particularly preferable to copolymerize a (meth)acrylate monomer having a hydroxyl group such as 2-hydroxyethyl(meth)acrylate is in order to improve the transparency of the silicone polymer according to the present invention. In the case the relevant substance is used, an amount thereof is preferably 0.1 to 25 parts by weight, more preferably 0.5 to 20 parts by weight, and most preferably 1.0 to 15 parts by weight because the improvement of the transparency cannot be effectively obtained in the case where the amount is too small, and physical properties of the polymer are adversely affected in the case where the amount is too large. In the case where the number of the hydroxyl groups in the silicone polymer is OH and the number of the ammonium nitrogen atoms therein is N, an N/OH ratio is preferably 0.00001 to 0.3, more preferably 0.001 to 0.25, and most preferably 0.001 to 0.2 because the antimicrobial activity thereby obtained is inadequately small in the case where the N/OH ratio is too small, and the polymer cannot be sufficiently transparent in the case where the N/OH ratio is too large. A method of measuring the N/OH ratio is selected depending on types and amounts of the silicone component, antimicrobial component and other components. Examples of the method are various measuring methods conventionally adopted such as various measuring methods conventionally adopted such as: nuclear magnetic resonance (NMR); infrared spectroscopy (IR); elemental analysis; attenuated total reflection infrared spectroscopy (ATR-IR); ultraviolet spectroscopy (UV); titration; and combinations of these methods. In the silicone polymer according to the present invention, a monomer having at least two copolymerizable carbon/carbon unsaturated bonds in a molecule thereof is preferably used as a copolymerizable component in order to obtain favorable mechanical properties and favorable tolerance for an antiseptic solution and a cleaning solution. A percentage of the monomer having at least two copolymerizable carbon/carbon unsaturated bonds in a molecule thereof is preferably 1 to 20% by weight, more preferably 0.3 to 15% by weight, and even more preferably 0.5 to 10% by weight.

The silicone polymer according to the present invention may include an ultraviolet absorbent, a colorant, a coloring agent and the like, or an ultraviolet absorbent, a colorant, and a coloring agent having a polymerizable group may be copolymerized and then included therein.

In the case where the silicone polymer according to the present invention is obtained by polymerization, a thermal initiator, typical examples of which are peroxide and an azo compound, or a photo-polymerization initiator is preferably added in order to facilitate the polymerization. In the case of the thermal polymerization, such a thermal initiator that has a decomposition property optimal to a desirable reaction temperature is selectively used. In general, an azo initiator or a peroxide initiator having a 10-hour half-life temperature in the range of 40° C. to 120° C. is preferably used. Examples of the photo-polymerization initiator include: carbonyl compound; peroxide; azo compound; sulfur compound; halogen compound; metal salt; and the like. Any of these photo-polymerization initiators may be solely used, or they may be mixed and used. An amount thereof to be added is at most approximately 1% by weight.

In the case where the silicone polymer according to the present invention is obtained by polymerization, a polymerization solvent may be used. Various organic and inorganic solvents are applicable as the solvent without any limitation. Examples thereof are various alcohol solvents such as: water, methanol; ethanol; propanol; 2-propanol; butanol; tert-butanol; tert-amylalcohol; and 3,7-dimethyl-3-octanol, various aromatic carbon hydride solvents such as: benzene; toluene; and xylene, various aliphatic carbon hydride solvents such as: hexane; heptane; octane; decane; petroleum ether; kerosine; ligroin; paraffin; and the like, various ketone solvents such as: acetone; methyl ethyl ketone; and methyl isobutyl ketone, various ester solvents such as: acetic ester; acetic butyl; methyl benzoate; dioctyl phthalate; and ethylene glycol diacetate, and various glycol ether solvents such as: diethylether; tetrahydroduran; dioxane; ethylene glycol dialkylether; diethylene glycol dialkylether; triethylene glycol dialkylether; tetraethylene glycol dialkylether; polyethylene glycol dialkylether; poly(ethylene glycol-propylene glycol) block copolymer; and poly(ethylene glycol-propylene glycol) random copolymer. Any of these solvents may be solely used, or they may be mixed and used.

As a method of polymerizing and molding the polymer according to the present invention can be adopted any conventional method. Examples of the method include a method wherein the polymer is temporarily molded in such a shape as a round bar or a plate and formed into a desirable shape according to a cutting operation or the like, a mold polymerization method, a spin casting method, and the like.

Below is described a case where the polymer according to the present invention is obtained by the mold polymerization method.

A space formed between two molds having a certain shape is filled with a monomer composition, and the monomer composition is photo-polymerized or thermally polymerized and formed into the shape formed by the molds. The molds are made of resin, glass, ceramics, metal or the like. In the case of the photo-polymerization, an optically transparent material is used, and resin or glass is conventionally used. In the case where the polymer is manufactured, a space is formed between molds facing each other in many cases, and the space is filled with the monomer composition. However, a gasket which is designed to give a certain thickness to the polymer and prevent the leak of the supplied monomer composition may be used together with the molds depending on the shapes of the molds and the properties of the monomer. The molds having the space filled with the monomer composition are subject to the irradiation of an active ray such as ultraviolet or placed in an open or a cistern to be heated therein, so that the monomer is polymerized. The thermal polymerization and the photo-polymerization may be employed together, for example, the monomer may be thermally polymerized after it is photo-polymerized, or may be photo-polymerized after it is thermally polymerized. In the case of the photo-polymerization, for example, light largely including ultraviolet supplied from a light source such as a mercury lamp or an insect-trap light is conventionally irradiated thereon for a short period of time (conventionally, at most one hour). In the case of the thermal polymerization, the monomer is preferably heated at around room temperature and then increasingly higher temperatures to finally reach 6° C. to 200° C. in a few hours or tens of hours so that an optical uniformity and a quality of the polymer are retained, and reproducibility thereof is increased.

A molded product formed from the polymer according to the present invention can be reformed in various methods. A reforming process which improves surface wettability is preferably performed.

More specifically describing the reforming process, the irradiation of an electromagnetic wave (including light), plasma irradiation, chemical vapor deposition processes such as vapor deposition and sputtering, heating, base treatment, acid treatment, the application of any suitable surface processing agent and combinations thereof, can be adopted. Of these reforming methods, the base treatment and the acid treatment, which are simplified methods, are preferable.

Examples of the base treatment and the acid treatment include a method wherein the molded product is made to contact a basic solution or an acid solution, a method wherein the molded product is made to contact basic or acid gas, and the like. More specifically describing the methods, for example, the molded product is dipped in the basic solution or the acid solution, the basic or acid solution or basic or acid gas is sprayed onto the molded product, the basic solution or the acid solution is applied to the molded product by a spatula, a brush or the like, or the basic solution or the acid solution is applied to the molded product by means of the spin coating method or the dip coating method. The most simplified method wherein the molded product can be most effectively reformed is to dip the molded product in the basic solution or the acid solution.

A temperature at which the molded product is dipped in the basic solution or the acid solution is not particularly limited, however, such a temperature range as approximately from −50° C. to 300° C. is conventionally adopted. In view of workability, a temperature range from −10° C. to 150° C. is more preferably adopted, and a temperature range from −5° C. to 60° C. is most preferably adopted. A length of time in which the molded product is dipped in the basic solution or the acid solution is variable depending on the temperature, however, it is conventionally preferably 0.1 to 100 hours, more preferably 0.3 to 24 hours, and most preferably 0.5 to 12 hours. A satisfactory processing effect cannot be obtained in the case where the contact time is too short. In the case where the contact time is too long, the workability and productivity may be deteriorated, and further, such adverse influences as the deterioration of the oxygen permeability and mechanical properties may be generated.

Examples of the base include: alkaline metal hydroxide; alkaline earth metal hydroxide; various carbonates; various borates; various phosphates; ammonia; various ammonium salts; various amines; polymeric bases such as polyethyleneimine and polyvinylamine, and the like. Of these examples, the alkaline metal hydroxide is most preferably used in view of its reasonable price and processing effect.

Examples of the acid include various inorganic acids such as: phosphoric acid; hydrochloric acid; and nitric acid, various organic acids such as: acetic acid; formic acid; benzoic acid; and phenol, various polymeric acids such as polyacrylic acid; and polystyrene sulfonic acid. Of these examples, polymeric acids are preferably used because a processing result thereby obtained is effectively high and adverse influences on other properties are lessened, and the polyacrylic acid is most preferably selected from the polymeric acids in view of its acidity and solubility.

Various organic and inorganic solvents can be used as a solvent for the basic solution or the acid solution. Examples thereof include water, various alcohols such as: methanol; ethanol; propanol; 2-propanol; butanol; ethylene glycol; diethylene glycol; triethylene glycol; tetraethylene glycol; polyethylene glycol; and glycerin, various aromatic carbon hydrides such as: benzene; toluene; and xylene, various aliphatic carbon hydrides such as: hexane; heptane; octane; decane; petroleum ether; kerosine; ligroin; and paraffin, various ketones such as: acetone; methylethyl ketone; and methylisobutyl ketone, various esters such as: ethyl acetate; butyl acetate; benzoic methyl; and dioctyl phthalate, various ethers such as: diethyl ether; tetrahydrofuran; dioxane; ethyleneglycol dialkyl ether; diethyleneglycol dialkyl ether; triethyleneglycol dialkyl ether; tetraethyleneglycol dialkyl ether; and polyethyleneglycol dialkyl ether, various polar aprotic solvents such as: dimethylformamide; dimethylacetamide; N-methyl-2-pyrrolidone; dimethyl imidazolidinone; hexamethylphosphoric triamide; and dimethyl sulfoxide, halogen solvents such as: methylene chloride; chloroform; dichloroethane; trichloroethane; and trichloroethylene, fleon solvents, and the like. Of these examples; water is most preferably used because it is economically efficient, easy to handle and chemically stable. A mixture containing at least two of these substances may be used as the solvent.

The basic solution or the acid solution used in the present invention may include components other than the basic or acid substance and the solvent.

The molded product may be washed after the base treatment or the acid treatment is performed thereto so that the basic or acid substance is removed.

Various organic and inorganic solvents can be used as a washing solvent. Examples thereof include water, various alcohols such as: methanol; ethanol; propanol; 2-propanol; butanol; ethylene glycol; diethylene glycol; triethylene glycol; tetraethylene glycol; polyethylene glycol; and glycerin, various aromatic carbon hydrides such as: benzene; toluene; and xylene, various aliphatic carbon hydrides such as: hexane; heptane; octane; decane; petroleum ether; kerosine; ligroin; and paraffin, various ketones such as: acetone; methylethyl ketone; and methylisobutyl ketone, various esters such as: ethyl acetate; butyl acetate; benzoic methyl; and dioctyl phthalate, various ethers such as: diethyl ether; tetrahydrofuran; dioxane; ethyleneglycol dialkyl ether; diethyleneglycol dialkyl ether; triethyleneglycol dialkyl ether; tetraethyleneglycol dialky ether; polyethyleneglycol dialkyl ether, various polar aprotic solvents such as: dimethylformamide; dimethylacetamide; N-methyl-2-pyrrolidone; dimethyl imidazolidinone; hexamethylphosphoric triamide; and dimethyl sulfoxide, halogen solvents such as: methylene chloride; chloroform; dichloroethane; trichloroethane; and trichloroethylene, fleon solvents, and the like.

A mixture containing at least two of these solvents may be used as the washing solvent. The washing solvent may include components other than the solvent, such as inorganic salts, a surface active agent, and a washing agent.

The reforming process may be performed to an entire area of the molded product or a part thereof, for example, only a surface thereof. In the case where only the surface is subjected to the reforming process, the surface wettability alone can be improved without largely modifying the general properties of the molded product.

An example of another method of improving the surface wettability of the molded product in which the polymer according to the present invention is used is an internal wetting agent method, wherein a hydrophilic polymer is added to the monomer mixture at the time of the polymerization, and the resulting mixture is then polymerized to retain the hydrophilic polymer in the molded product, so that the surface wettability is improved. Examples of the hydrophilic polymer used as the internal wetting agent include polyvinyl cyclic amides such as polyvinyl pyrrolidone, polyvinyl cyclic amines such as polyvinylimidazole, polyacrylic amides such as poly-N,N-dimethylacrylamide, polyalcohols such as polyvinyl alcohol, polycarbonic acids such as polyacrylic acid, polyethylene glycols, and a mixture or a copolymer of these substances, and the like. Of these examples, the polyvinyl pyrrolidone is most preferably selected in order to improve the surface wettability of the molded product.

In the case where the oxygen permeability of the ophthalmic lenses according to the present invention is too low, ophthalmic lesions occur due to the lack of oxygen particularly when the lenses are continuously worn. The oxygen permeability too high would invite the deterioration of the other properties necessary for ophthalmic lenses. Therefore, an oxygen permeability coefficient is preferably $70 \times 10^{-11}$ to $500 \times 10^{-11}$ $(cm^2/sec)mLO_2/(mL \cdot hPa)$.

The antimicrobial activity of the ophthalmic lenses according to the present invention is determined such that, in the case where three counts of *Pseudomonas aeruginosa* in three samples are measured, the antimicrobial activity at an effective level is obtained with no bacteria proliferation in the case where an average value of three colony counts after incubation is at most four times as large as an average value of three initial colony counts before the incubation. The average value is more preferably 10% or less of the average value of controlled colony counts, and most preferably 1% or less of the average value of the controlled colony counts. The polymer according to the present invention is suitably used in the ophthalmic lenses such as contact lenses, intraocular lenses and artificial cornea.

EXAMPLES

Hereinafter, the present invention is specifically described referring to Examples, however, the present invention is not limited thereto.

Synthesis Example 1

N-vinylimidazole (4.71 g, 50 mmol), n-ocyl iodide (12.01 g, 50 mmol), 2,6-di-t-butyl-4-methylphenol (BHT, 0.1672 g) were added to a 50-mL round-bottomed flask, and heated at 65° C. for 14 hours. After the reaction, the resulting solution was subjected to column purification, wherein 90 g of silica gel was used, and chloroform/methanol=50/1 (360 mL)→30/1 (360 mL)→20/1 (360 mL)→10/1 180 mL)→5/1 (180 mL) was used as an eluate. Then, fractions including targeted spots were collected by the TLC, and the solvent was distilled away by an evaporator. As a result, a yellow oil-like ammonium salt monomer represented by the following formula (x1) was obtained.

[Formula 11]

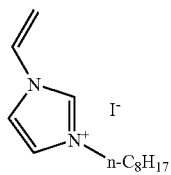
(x1)

Synthesis Example 2

A reflux condenser was attached to a 200-mL round-bottomed flask, and a synthesizing process similar to that of the Synthesis Example 1 was performed except that n-butyl iodide (11.05 g, 60 mmol) was used in place of n-octyl iodide and 50 mL of acetone was used as the solvent. After the reaction, the solvent was distilled away by the evaporator, and a purification process similar to that of the Synthesis Example 1 was performed. As a result, a yellow oil-like ammonium salt monomer represented by the following formula (x2) was obtained.

[Formula 12]

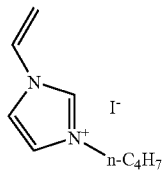
(x2)

Synthesis Example 3

A reflux condenser was attached to a 50-mL round-bottomed flask, and a synthesizing process and a purification process similar to those of the Synthesis Example 1 were performed, except that n-butyl chloride (13.89 g, 150 mmol) was used in place of n-octyl iodide and the solution was reacted at 90° C. for 20 hours. As a result, a yellow oil-like ammonium salt monomer represented by the following formula (x3) was obtained.

[Formula 13]

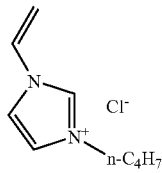
(x3)

Synthesis Examples 4 to 9

A synthesizing process and a purification process similar to those of the Synthesis Example 1 were performed except that alkyl halide represented by the general formula $R^1$—X was used in place of n-octyl iodide as shown in Table 1. As a result, ammonium salt monomers represented by the following formulas (x4) to (x9) were obtained.

[Formula 14]

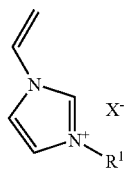
(x4)~(x9)

TABLE 1

| | Formula | $R^1$ | X |
|---|---|---|---|
| Synthesis Example 1 | (x1) | n-octyl | I |
| Synthesis Example 2 | (x2) | n-butyl | I |
| Synthesis Example 3 | (x3) | n-butyl | Cl |
| Synthesis Example 4 | (x4) | n-hexyl | Br |
| Synthesis Example 5 | (x5) | n-hexyl | I |
| Synthesis Example 6 | (x6) | n-octyl | Br |
| Synthesis Example 7 | (x7) | n-nonyl | I |
| Synthesis Example 8 | (x8) | n-decyl | I |
| Synthesis Example 9 | (x9) | n-undecyl | I |

Example 1

A silicone compound (molecular weight: 423, 30 parts by weight) represented by the following formula (y1):

[Formula 15]

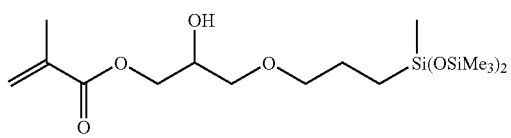
(y1)

N,N-dimethyl acrylamide (36.8 parts by weight); polydimethyl siloxane represented by the following formula (y2) wherein one terminal is methacrylated (molecular weight: approximately 1,000, 30 parts by weight):

[Formula 16]

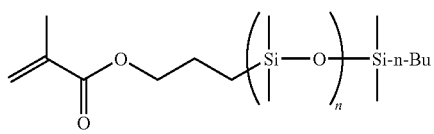
(y2)

polydimethyl siloxane wherein both terminals are methacrylated (molecular weight: approximately 1,000, 3.1 parts by weight); the ammonium salt monomer obtained in Example 1 (x1) (5.8 parts by weight); a photo-polymerization initiator Irgacure 1850 (1.0 parts by weight); and 3,7-dimethyl-3-octanol (22.4 parts by weight) were mixed and agitated. An N/OH ratio thereby obtained was as shown in Table 2. A homogeneous and transparent monomer mixture was obtained. The monomer mixture was degassed in the argon atmosphere. A central portion was cut out from two parafilms having the thickness of 100 μm, and the two sheets were interposed as a spacer between two glass plates having the shape of a 10 cm square and the thickness of 3 mm (an aluminum seal was attached to one of them so that a film-shape sample could easily separate from the glass plate after polymerization) in a glove box in the nitrogen atmosphere, and the monomer mixture was poured thereinto. Then, light was irradiated thereon (FL6D Daylight fluorescent lamp supplied by TOSHIBA CORPORATION, 8.4 klx, 15 minutes) so that the monomer mixture was polymerized between the plates. As a result, a sample having a film shape was obtained.

The obtained film-shape sample was subjected to the irradiation of supersonic wave in water for 20 minutes to be separated from the glass plates. The obtained sample was dipped in a 60% IPA water solution at 60° C. for one night, and further dipped in a 80% IPA water solution at 60° C. for 2 hours so that impurities, such as the residual monomer, were extracted therefrom. Then, the sample was dipped in water solutions in which an IPA concentration was reduced in stages, which were a 50% IPA water solution, a 25% water solution, and then, water, for approximately 30 minutes each, and thereby hydrated. Then, the sample was dipped in a boric acid buffer (pH 7.1 to 7.3) in a 200-mL glass bottle, and the glass bottle was placed in an autoclave, and boiled therein at 120° C. for 30 minutes. After the glass bottle was cooled down, the film-shape sample was taken out of the glass bottle and dipped in the boric acid buffer (pH 7.1 to 7.3). The obtained sample was transparent and clear, and suitable as a polymer used for contact lenses.

TABLE 2

|  | N/OH ratio |
| --- | --- |
| Example 1 | 0.25 |
| Example 2 | 0.30 |
| Example 3 | 0.45 |
| Example 4 | 0.10 |
| Example 5 | 0.08 |
| Example 6 | 0.09 |
| Example 7 | 0.07 |
| Example 8 | 0.07 |
| Example 9 | 0.07 |
| Comparative Example 4 | 1.06 |

Example 2

A sample having a film shape was obtained in a manner similar to Example 1 except that the monomer represented by the formula (x2) obtained in the Synthesis Example 2 was used as the ammonium salt monomer in place of the monomer represented by the formula (x1). An N/OH ratio thereby obtained was as shown in the Table 2. The obtained sample was transparent and clear, and suitable as the polymer used for contact lenses.

Example 3

A sample having a film shape was obtained in a manner similar to Example 1 except that the monomer represented by the formula (x3) obtained in the Synthesis Example 3 was used as the ammonium salt monomer in place of the monomer represented by the formula (x1). An N/OH ratio thereby obtained was as shown in the Table 2. The obtained sample was transparent and clear, and suitable as the polymer used for contact lenses.

Examples 1-2

The monomer composition was replaced with a mixture containing the silicone compound (23 parts by weight.) represented by the formula (y1):

Formula 17

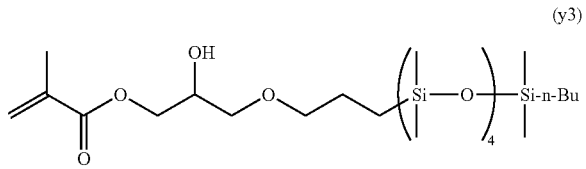

a silicone compound (35 parts by weight.) represented by the following formula (y3); N,N-dimethyl acrylamide (28 parts by weight.); poly(vinylpyrrolidone) (K-90, 8 parts by weight.); 2-hydroxyethyl methacrylate (12 parts by weight.); tri(ethyleneglycol)dimetacrylate (1 parts by weight.); polydimethyl siloxane (molecular weight: approximately 1,000, 1 parts by weight.); the monomer represented by the formula (x1)

(5 parts by weight.); the photo-polymerization initiator Irgacure 1850 (1 parts by weight.); and 3,7-dimethyl-3-octanol (14 parts by weight.), and a polymerization process and a post process similar to those of Example 1 were conducted. As a result, a sample for the evaluation of an antimicrobial activity was obtained.

Examples 4 to 9

Samples having a film shape were obtained in a manner similar to Examples 1-2 except that the monomers represented by the formulas (x4) to (x9) were used in place of the monomer represented by the formula (x1). N/OH ratios thereby obtained were as shown in the Table 2. The obtained samples were transparent and clear, and suitable as the polymer used for contact lenses. A modulus and an elongation of a part of the samples were measured, which exhibited favorable properties as shown in Table 3.

TABLE 3

|  | Modulus (psi) | Elongation (%) |
| --- | --- | --- |
| Example 1 | 43 | 251 |
| Example 4 | 50 | 254 |
| Example 5 | 42 | 287 |
| Example 6 | 56 | 304 |

Comparative Example 1

The silicone monomer (y2) having a molecular weight of approximately 1,000 was replaced with a silicone monomer having a molecular weight of approximately 5,000, and then, a film-shape sample was desirably obtained in a manner similar to Example 1. However, the film thereby obtained was cloudy with no transparency.

Comparative Example 2

The silicone monomer (y2) was replaced with a silicone macromer having a molecular weight of approximately 3,260 represented by the following formula (y4):

Formula 18

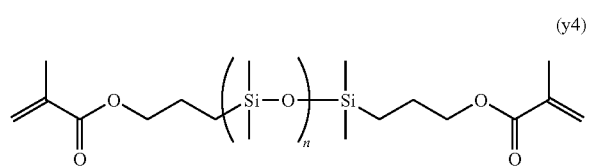
(y4)

and then, a film-shape sample was desirably obtained in a manner similar to Example 1. However, the film thereby obtained was cloudy with no transparency.

Comparative Example 3

The silicone monomer (y2) was replaced with a silicone macromer having a molecular weight of approximately 4,740 represented by the formula (y4), and then, a film-shape sample was desirably obtained in a manner similar to Example 1. However, the film thereby obtained was cloudy with no transparency.

Comparative Example 4

A film was desirably obtained in a manner similar to Example 1 except that the amount of the ammonium salt monomer (x1) was changed to 25 parts by weight. (N/OH ratio: 1.06). However, the film thereby obtained was cloudy with no transparency.

Comparative Example 5

A film-shape sample was obtained by polymerizing in a manner similar to Example 1 except that the ammonium salt monomer (x1) was not added. A 3 cm square was cut out from the obtained film and used as a sample for the evaluation of the antimicrobial activity.

Comparative Example 6

The film-shape sample obtained in Comparative Example 4 was put in a 50-mL screw tube, and dipped in a 1.7% PVP/polymethylvinyl imidazolium chloride (95/5) water solution at room temperature for 16 hours.
Evaluation of Antimicrobial Activity
Three each of the film-shape samples obtained in Examples 1 to 9 were prepared, which were inoculated with *Pseudomonas Aeruginosa* (*Pseudomonas Aeruginosa* NRBC 13275), which were typical bacteria detected when the contact lenses are worn, based on such a testing method as JIS Z 2801:2000, "antimicrobial products-antimicrobial testing methods/antimicrobial effect" 5.2 plastic products. Then, the colony counts immediately after the inoculation (initial colony counts) and the colony counts at 35° C. in 24 hours after the inoculation were counted so that an antimicrobial evaluation was conducted. A result thereby obtained is shown in the Table 3. In the film-shape sample obtained in Comparative Example 4 as a result of the polymerization wherein the ammonium salt monomer was not added, the bacteria proliferation was detected in comparison to the initial colony count. In the film-shape samples obtained in Examples 1 to 3, however, the proliferation was controlled or reduced by two to three digits in comparison to the initial colony counts, which exhibited the antimicrobial activity at a satisfactory level.

TABLE 4

| | Measurement 1 | Measurement 2 | Measurement 3 | Avarage |
|---|---|---|---|---|
| Initial colony counts | $2.10 \times 10^5$ | $2.00 \times 10^5$ | $2.60 \times 10^5$ | $2.23 \times 10^5$ |
| Example 1 | $1.40 \times 10^2$ | $3.40 \times 10^2$ | $1.50 \times 10^2$ | $2.10 \times 10^2$ |
| Example 2 | $1.30 \times 10^5$ | $2.10 \times 10^5$ | $5.70 \times 10^5$ | $3.03 \times 10^5$ |
| Example 3 | $6.90 \times 10^2$ | $1.60 \times 10^4$ | <10 | $8.35 \times 10^3$ |
| Example 4 | $2.30 \times 10^3$ | $7.00 \times 10^3$ | $8.10 \times 10^4$ | $3.01 \times 10^4$ |
| Example 6 | <10 | <10 | <10 | <10 |
| Example 7 | <10 | <10 | <10 | <10 |
| Example 8 | <10 | <10 | <10 | <10 |
| Example 9 | $4.60 \times 10^3$ | $1.40 \times 10^3$ | $6.50 \times 10^3$ | $4.17 \times 10^3$ |
| Example 10 | <10 | <10 | <10 | <10 |
| Example 10 | <10 | <10 | <10 | <10 |
| Comparative Example 5 | $6.30 \times 10^6$ | $8.13 \times 10^6$ | $7.26 \times 10^6$ | $7.23 \times 10^6$ |

Evaluation of Antimicrobial Activity after Supersonic Wave Washing
The film-shape samples obtained in Example 1 and Comparative Example 5 were dipped in 300 mL of distilled water and washed with supersonic wave for 15 minutes, and then, taken out to be evaluated for the antimicrobial activity in a manner similar to the foregoing example. A result thereby obtained is as shown in Table 4. In the film-shape sample obtained in Comparative Example 5, which was simply dipped in the antimicrobial polymeric water solution, the antimicrobial activity was lost and the bacteria proliferation was observed. On the contrary, the antimicrobial activity of the film-shape sample obtained in Example 1 was satisfactory even after it was washed with supersonic wave.

TABLE 5

| | Measurement 1 | Measurement 2 | Measurement 3 | Average |
|---|---|---|---|---|
| Initial colony counts | $2.13 \times 10^5$ | $2.52 \times 10^5$ | $2.70 \times 10^5$ | $2.45 \times 10^5$ |
| Example 1 | $2.35 \times 10^2$ | $4.24 \times 10^2$ | $3.24 \times 10^2$ | $3.24 \times 10^2$ |
| Comparative Example 6 | $5.42 \times 10^6$ | $5.05 \times 10^6$ | $5.23 \times 10^5$ | $5.23 \times 10^6$ |

Example 11

A process similar to that of Example 1, in which boiling was included, was performed except that molds for contact lens made of transparent resin (poly4-methylpentene-1) were used in place of the glass plates, and then, a sample for contact lens was obtained

The invention claimed is:
1. A silicone-containing polymer comprising a polymer obtained by polymerizing one or two or more silicone-containing monomers having a molecular weight of 1,800 or less and a monomer having an ammonium salt in a molecule thereof, wherein, in an ammonium cation group of the ammonium salt, three substituents other than a substituent group bonded to a polymerizable group on a nitrogen atom are each independently an optionally substituted alkyl group having 1 to 20 carbon atoms, or an optionally substituted aryl group having 6 to 20 carbon atoms, and wherein these substituents together form a ring;
wherein the monomer having the ammonium salt in the molecule thereof is a monomer represented by the following formula (f):

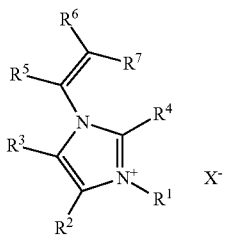

(f)

wherein $R^1$ represents an optionally substituted alkyl group having 1 to 30 carbon atoms; $R^2$ to $R^7$ each represents an optionally substituted alkyl group having 1 to 20 carbon atoms or an optionally substituted aryl group having 6 to 20 carbon atoms, $R^2$ and $R^3$ may together form a ring and $X^-$ represents an optional anion.

2. The silicone-containing polymer according to claim 1, wherein an N/OH ratio is 0.00001 to 0.3 provided that the number of hydroxyl groups in the silicone-containing polymer is OH and the number of ammonium nitrogen atoms therein is N.

3. The silicone-containing polymer according to claim 1, wherein the silicone-containing monomers include a silicone-containing monomer having a structure expressed by the following general formula (a):

M-L-Sx   (a)

wherein M represents an acryl group or a methacryl group, L represents an optionally substituted divalent organic group having 1-20 carbon atoms, Sx represents a siloxanyl group expressed by the following general formula (b):

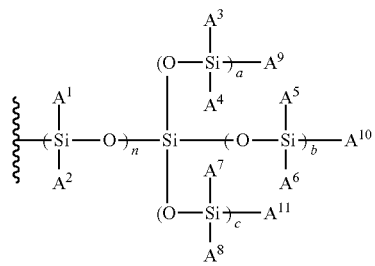

(b)

wherein the formula (b), $A^1$ to $A^{11}$ each independently represents any of hydrogen, an optionally substituted alkyl group having 1 to 20 carbon atoms and an optionally substituted aryl group having 6 to 20 carbon atoms, n represents an integral number of 0 to 200, and a, b and c each independently represents an integral number of 0 to 20, except for the case where n=a=b=c=0.

4. The silicone-containing polymer according to claim 3, wherein L in the formula (a) represents a divalent organic group having at least a hydroxyl group.

5. The silicone-containing polymer according to claim 4, wherein L in the formula (a) is a divalent organic group expressed by the following general formula (c):

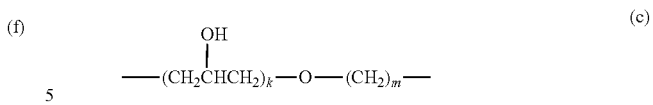

(c)

wherein k represents an integral number of 1 to 6, and m represents an integral number of 1 to 17, provided that $3k+m \leq 20$.

6. The silicone-containing polymer according to claim 1, wherein at least one of the silicone-containing monomers is a monomer selected from the group consisting of monomers having structures expressed by the following formulas (d), (e) and (i):

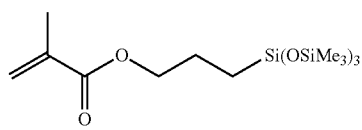

(d)

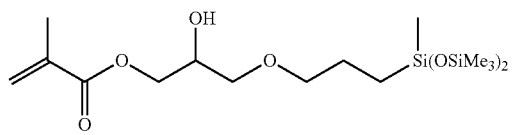

(e)

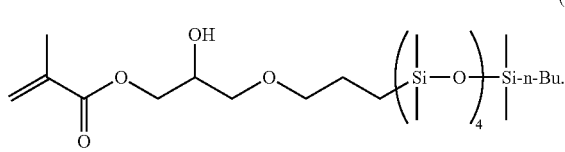

(i)

7. The silicone-containing polymer according to claim 1, wherein $R^1$ in the formula (f) is an optionally substituted alkyl group having 4 to 20 carbon atoms.

8. An ophthalmic lens, comprising a silicone-containing polymer obtained by polymerizing one or two or more silicone-containing monomers having a molecular weight of 1800 or less and a monomer having ammonium salt in a molecule thereof, wherein the one or two or more silicone-containing monomers comprise a silicone-containing monomer comprising a divalent organic group having at least a hydroxyl group.

9. The ophthalmic lens of claim 8, wherein the ophthalmic lens comprises a contact lens.

10. The ophthalmic lens of claim 8, wherein, in an ammonium cation group of the ammonium salt, three substituents other than a substituent group bonded to a polymerizable group are each independently an optionally substituted alkyl group having 1 to 20 carbon atoms, or an optionally substituted aryl group having 6 to 20 carbon atoms, and wherein these substituents together form a ring.

11. The ophthalmic lens of claim 8, wherein an amount of the one or two or more silicone-containing monomers is about 20 parts to about 80 parts by weight and an amount of the monomer having the ammonium salt is about 0.001 parts to about 20 parts by weight, provided that a total weight of monomers other than the monomer having the ammonium salt is about 100 parts.

12. The ophthalmic lens of claim 8, wherein the divalent organic group comprises about 1 carbon atom to about 20 carbon atoms.

* * * * *